Patented Mar. 3, 1931

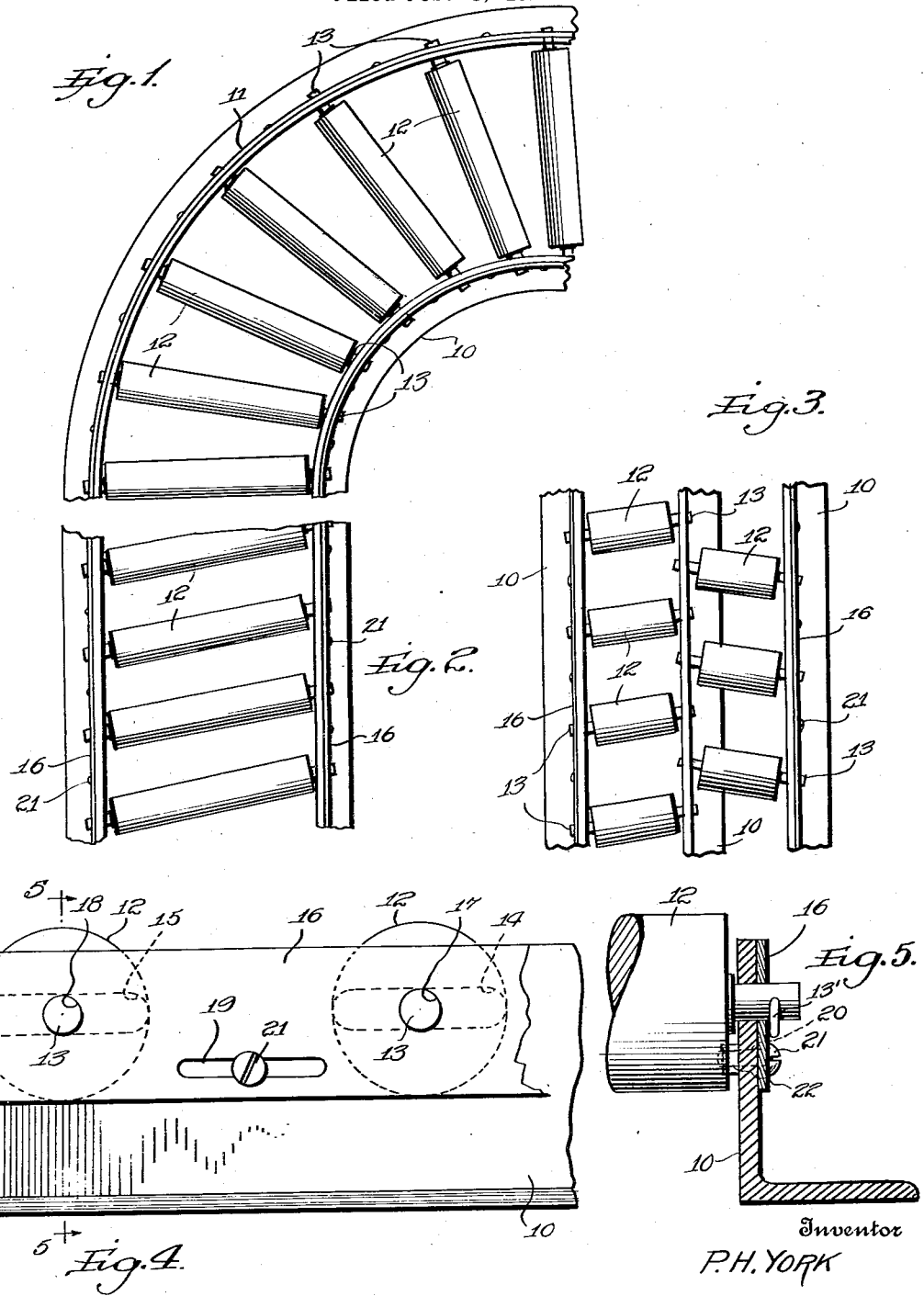

1,795,192

UNITED STATES PATENT OFFICE

PHINEAS HIRAM YORK, OF INDIANAPOLIS, INDIANA, ASSIGNOR TO LOGAN CO., OF LOUISVILLE, KENTUCKY, A CORPORATION OF KENTUCKY

CONVEYER

Application filed February 3, 1928. Serial No. 251,720.

This invention relates to conveyers and more particularly to attachments for roller conveyers by means of which the ends of the rollers at the curves of a conveyer may be moved longitudinally of the side rails of the conveyer in order that the packages which are being conveyed will not contact with the side rails.

An important object of the invention is to provide a simple, efficient and relatively inexpensive device of the character referred to.

Another object of the invention is to provide a mounting for the rollers of a roller conveyer by means of which the ends of the rollers may be easily and quickly moved longitudinally of the side rails of the conveyer.

Other objects and advantages of the invention will become apparent from the following description.

In conveying packages around a curve of a roller conveyer, it is desirable to provide means for preventing the violent contact of the packages with the sides of the conveyer. This result may be accomplished in numerous ways such as by mounting the rollers in a plurality of sections and rotating those sections nearest the outside rail at a faster rate of speed than the sections of the rollers which are nearest the inside rail. Another way in which the desired result may be accomplished is by forming the rollers in such manner that the diameter of the portions of the rollers adjacent the outside rail of the conveyer is greater than the diameter of the portions of the rollers adjacent the inside rail of the conveyer. Another method of accomplishing the result desired is by employing rollers having the same diameter throughout their lengths but so arranged that one of their ends leads the other ends, or in other words, so that the axes of the rollers do not coincide with the radii of the conveyer curve. The amount of lead of the ends of the rollers cannot be satisfactorily determined theoretically but must be determined by experiments carried out under the exact conditions under which the conveyer will be operated when in actual use. For this reason it is highly desirable that the conveyer be provided with means by which the user may simply and quickly adjust the ends of the rollers longitudinally of the side rails of the conveyer and thereby readily secure the proper lead for the ends of the rollers. Moreover, on straight conveyers having either a single or multiple row of rollers, it likewise is often desirable to arrange the rollers at some angle other than a right angle to the conveyer frame and to provide means for readily adjusting the angle of the rollers.

In the accompanying drawing I have shown a preferred construction by which the desired results above referred to may advantageously be secured. In this showing, Figure 1 is a plan view of a curved roller conveyer, Figure 2 is a similar view of a straight portion of a roller conveyer, Figure 3 is a similar view of a conveyer having a plurality of rows of rollers.

Figure 4 is a detail view in side elevation of a portion of the device, and,

Figure 5 is a section on line 5—5 of Figure 4.

Referring to the drawing, numerals 10 and 11 designate side rails of a conveyer, such rails preferably being formed of steel angle irons as clearly shown in Figure 5. A plurality of rollers 12 provided with stub shafts 13 are journaled in the side rails 10 and 11 and secured in position by means of cotter pins 13'. As shown in Figures 4 and 5, the side rails 10 and 11 are provided with a plurality of elongated substantially horizontal slots 14 and 15 forming bearings for the shafts of the rollers. Plates or strips 16, preferably made of light steel are arranged adjacent and in contact with the outside faces of the rails 10 and 11. These plates are provided with openings 17 and 18 which substantially correspond in shape and size to the shape and size of the shafts of the rollers 12. The plates 16 are also provided intermediate the openings 17 and 18 with longitudinal slots 19. At various points in the side rails 10 corresponding in position to the slots 19, the side rails are provided with openings 20 adapted to receive bolts 21 which together with the nuts 22, are adapted to secure the plates 16 to the rails 10.

When it is desired to move one end of the rollers in the manner suggested above, it is simply necessary to unscrew the nuts 22 on the bolts 21 and move one of the plates 16 longitudinally with respect to the side rail of the conveyer. This longitudinal movement of the plate 16 effects a corresponding movement of the ends of the rollers because of the fact that the shafts of the rollers are received in the openings 17 and 18 in the plate 16. When the ends of the rollers have been moved to the desired point, the nuts are tightened on the bolts 21 thereby securing the plate 16 in position so that it cannot be moved longitudinally with respect to the side rails of the conveyer, thus preventing movement of the ends of the rollers longitudinally of the conveyer frame. It will be apparent that either or both of the plates 16 may be moved longitudinally of the rails 10 and 11 thereby providing a relatively great movement of the rollers 12 with respect to the side rails.

It is to be understood that the form of my invention herein shown and described is to be taken as a preferred example of the same and that various changes in the shape, size, and arrangement of parts may be resorted to without departing from the spirit of the invention or the scope of the subjoined claims.

I claim:

1. A conveyer comprising a pair of arcuate concentric side rails, a plurality of rollers adjustably carried by said side rails, and an arcuate plate arranged adjacent and concentric with one of said side rails and adapted to be moved longitudinally thereof, said plate being provided with spaced openings adapted to receive the outer portions of said rollers adjacent one end thereof.

2. A conveyer comprising a pair of arcuate concentric side rails, a plurality of rollers adjustably carried by said side rails, an arcuate plate arranged adjacent and concentric with one of said side rails and adapted to be moved longitudinally thereof, said plate being provided with spaced openings adapted to receive the outer portions of said rollers adjacent one end thereof, and means for adjustably securing said plate to said juxtaposed side rail.

3. A conveyer comprising a pair of arcuate concentric side rails, one of said side rails being provided with a plurality of elongated openings, a plurality of rollers provided with shafts arranged in said openings, and means arranged adjacent one of said side rails and adapted to move one end of a plurality of said shafts longitudinally of said side rails.

4. A conveyer comprising a pair of arcuate concentric side rails, one of said rails being provided with a plurality of elongated substantially horizontal slots, a plurality of rollers provided with shafts arranged in said slots, and an adjustable arcuate plate member provided with a plurality of spaced openings adapted to receive a plurality of said shafts adjacent one end of said rollers, said plate member being concentric with and adapted to be moved longitudinally of said side rails.

5. A conveyer comprising a pair of arcuate concentric side rails, one of said side rails being provided with a plurality of elongated substantially horizontal slots, a plurality of rollers provided with shafts journaled in said slots, an arcuate plate provided with a plurality of spaced openings adapted to receive a plurality of said shafts adjacent one end of said rollers, said plate being further provided with a second elongated slot, and fastening means extending through said second named slot in said plate for adjustably securing said plate to said side rail.

In testimony whereof I affix my signature.

PHINEAS HIRAM YORK.